US012560091B2

(12) United States Patent
Miyahisa et al.

(10) Patent No.: US 12,560,091 B2

(45) Date of Patent: Feb. 24, 2026

(54) GAS TURBINE STATOR BLADE AND GAS TURBINE

(71) Applicant: MITSUBISHI HEAVY INDUSTRIES, LTD., Tokyo (JP)

(72) Inventors: Yasuo Miyahisa, Tokyo (JP); Saki Matsuo, Tokyo (JP); Satoshi Mizukami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/872,495

(22) PCT Filed: Jun. 5, 2023

(86) PCT No.: PCT/JP2023/020745
§ 371 (c)(1),
(2) Date: Dec. 6, 2024

(87) PCT Pub. No.: WO2024/004529
PCT Pub. Date: Jan. 4, 2024

(65) Prior Publication Data

US 2025/0361812 A1 Nov. 27, 2025

(30) Foreign Application Priority Data

Jul. 1, 2022 (JP) ................................ 2022-106933

(51) Int. Cl.
*F01D 5/18* (2006.01)

(52) U.S. Cl.
CPC ........ *F01D 5/189* (2013.01); *F05D 2260/201* (2013.01); *F05D 2260/202* (2013.01)

(58) Field of Classification Search
CPC . F01D 5/18; F01D 5/187; F01D 5/188; F01D 5/189; F01D 25/12; F05D 2260/201; F05D 2260/202
See application file for complete search history.

(56) References Cited

U.S. PATENT DOCUMENTS

2011/0103971 A1* 5/2011 Hada ...................... F01D 5/189 416/97 R
2016/0097286 A1 4/2016 Tibbott et al.
(Continued)

FOREIGN PATENT DOCUMENTS

JP 5022097 9/2012
JP 2017-078416 4/2017

OTHER PUBLICATIONS

International Search Report issued Jul. 25, 2023 in International Application No. PCT/JP2023/020745, with English translation.
(Continued)

*Primary Examiner* — Elton K Wong
(74) *Attorney, Agent, or Firm* — Wenderoth, Lind & Ponack, L.L.P.

(57) ABSTRACT

A gas turbine stator blade includes a leading edge portion partition wall divides an in-blade cavity into a leading edge-side cavity and a trailing edge-side cavity, a negative pressure surface-side partition wall formed integrally with the blade body, divides the leading edge-side cavity into a negative pressure surface-side cavity and a pressure surface-side cavity, and is formed with a negative pressure surface-side impingement cooling hole, and a tube-shaped pressure surface-side insert inserted into the pressure surface-side cavity to provide a first gap between the pressure surface forming wall and the pressure surface-side insert and a second gap between the negative pressure surface-side partition wall and the pressure surface-side insert and is formed with a pressure surface-side impingement cooling hole. A part of cooling air cools the negative pressure surface forming wall by passing through the first gap, the second gap, and the negative pressure surface-side impingement cooling hole.

11 Claims, 5 Drawing Sheets

(56) References Cited

U.S. PATENT DOCUMENTS

| | | | | |
|---|---|---|---|---|
| 2017/0107825 | A1 | 4/2017 | Krumanaker et al. | |
| 2020/0024966 | A1 * | 1/2020 | Craig, III ................ | F01D 5/187 |

OTHER PUBLICATIONS

Office Action issued Jul. 15, 2025 in corresponding Japanese Patent Application No. 2024-530605, with English machine translation.

* cited by examiner

GAS TURBINE STATOR BLADE AND GAS TURBINE

TECHNICAL FIELD

The present disclosure relates to a gas turbine stator blade and a gas turbine.

The present application claims priority based on Japanese Patent Application No. 2022-106933 filed in Japan on Jul. 1, 2022, the contents of which are incorporated herein by reference.

BACKGROUND ART

PTL 1 discloses a structure that reduces a cooling air amount for cooling a gas turbine stator blade. In a blade body of the gas turbine stator blade, an in-blade cavity is formed between a negative pressure surface forming wall and a pressure surface forming wall. The blade body thereof is provided with a leading edge portion partition wall extending from an inner surface of the negative pressure surface forming wall to an inner surface of the pressure surface forming wall to divide the in-blade cavity into a leading edge-side cavity and a trailing edge-side cavity. One hollow insert is disposed on each of a pressure surface side and a negative pressure surface side of the leading edge-side cavity. A part of cooling air that is blown toward the inner surface of the pressure surface forming wall of the blade body from an impingement cooling hole of the insert disposed on the pressure surface side flows along the inner surface of the blade body to be initially introduced into an inside of the insert disposed on the negative pressure surface side, then is blown toward the inner surface of the negative pressure surface forming wall from an impingement cooling hole of the insert disposed on the negative pressure surface side, and then is discharged to the outside of the blade body from a film cooling hole formed in the negative pressure surface forming wall.

CITATION LIST

Patent Literature

[PTL 1] Japanese Patent No. 5022097

SUMMARY OF INVENTION

Technical Problem

In the gas turbine stator blade disclosed in PTL 1, in order to suppress a part of the cooling air that is blown toward the inner surface of the pressure surface forming wall of the blade body from the impingement cooling hole of the insert disposed on the pressure surface side from flowing into the film cooling hole of the negative pressure surface instead of flowing into the insert on the negative pressure surface side, a rib-shaped wall that protrudes from the inner surface of the blade body toward the insert on the negative pressure surface side and a rib-shaped wall that protrudes from the leading edge portion partition wall toward the insert on the negative pressure surface side are provided on both sides with the insert on the negative pressure surface side sandwiched therebetween in the leading edge-side cavity.

However, since the rib-shaped walls and the insert on the negative pressure surface side are configured with separate members, the cooling air leaks from a gap between the rib-shaped wall and the insert on the negative pressure surface side, and thus the effect of impingement cooling on the inner surface of the negative pressure surface forming wall is reduced. For this reason, the effect of reducing the cooling air is limited in the gas turbine stator blade disclosed in PTL 1.

In view of the above circumstances, an object of at least one embodiment of the present disclosure is to provide a gas turbine stator blade and a gas turbine capable of reducing a cooling air amount for cooling the gas turbine stator blade.

Solution to Problem

In order to achieve the above object, a gas turbine stator blade according to at least one embodiment of the present disclosure includes a blade body including a negative pressure surface forming wall that forms a negative pressure surface and a pressure surface forming wall that forms a pressure surface and forms an in-blade cavity between the negative pressure surface forming wall and the pressure surface forming wall, a leading edge portion partition wall that is formed integrally with the blade body and extends from an inner surface of the negative pressure surface forming wall to an inner surface of the pressure surface forming wall to divide the in-blade cavity into a leading edge-side cavity and a trailing edge-side cavity, a negative pressure surface-side partition wall that is formed integrally with the blade body, extends from an inner surface of the blade body to the leading edge portion partition wall in the leading edge-side cavity to divide the leading edge-side cavity into a negative pressure surface-side cavity and a pressure surface-side cavity, and is formed with a negative pressure surface-side impingement cooling hole for cooling the negative pressure surface forming wall, and a tube-shaped pressure surface-side insert that is inserted into the pressure surface-side cavity to provide a first gap between the pressure surface forming wall and the pressure surface-side insert and a second gap between the negative pressure surface-side partition wall and the pressure surface-side insert and is formed with a pressure surface-side impingement cooling hole for cooling the pressure surface forming wall, in which at least a part of cooling air passing through the pressure surface-side impingement cooling hole of the pressure surface-side insert is configured to cool the negative pressure surface forming wall by passing through the first gap, the second gap, and the negative pressure surface-side impingement cooling hole.

In order to achieve the above object, a gas turbine according to at least one embodiment of the present disclosure comprises the gas turbine stator blade, a turbine rotor, and a casing that accommodates the turbine rotor.

Advantageous Effects of Invention

According to at least one embodiment of the present disclosure, the gas turbine stator blade and the gas turbine capable of reducing the cooling air amount for cooling the gas turbine stator blade are provided.

DESCRIPTION OF EMBODIMENTS

Figure 1:
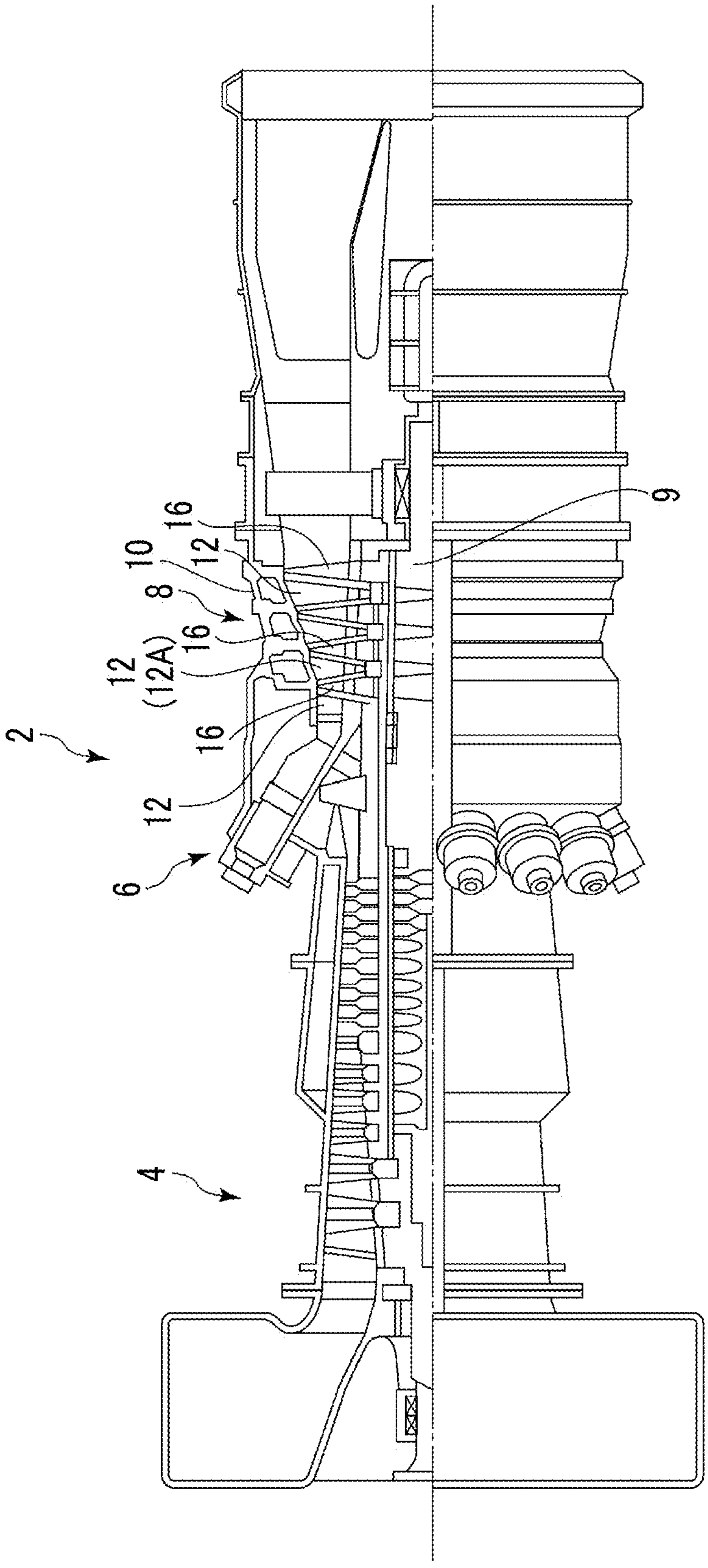
FIG. 1 is a diagram showing a schematic configuration of a gas turbine 2 according to an embodiment.

Hereinafter, some embodiments of the present disclosure will be described with reference to the accompanying drawings. Dimensions, materials, shapes, relative arrangements, and the like of components described as embodiments or shown in the drawings are not intended to limit the scope of the invention, but are merely explanatory examples.

For example, expressions such as "in a certain direction", "along a certain direction", "parallel", "orthogonal", "center", and "concentric" or "coaxial", which represent relative or absolute dispositions, not only strictly represent such a disposition but also represent a state of relative displacement with a tolerance or at an angle or distance to the extent that the same function can be obtained.

For example, expressions such as "identical", "equal", and "homogeneous", which represent that things are in an equal state, not only strictly represent the equal state but also represent a state where a tolerance or a difference to the extent that the same function can be obtained is present.

For example, an expression representing a shape such as a quadrangular shape or a cylindrical shape not only represents a shape such as a quadrangular shape or a cylindrical shape in a geometrically strict sense but also represents a shape including an undulating portion, a chamfering portion, or the like within a range where the same effect can be obtained.

On the other hand, the expressions "being provided with", "composing", "including", or "having" one component are not exclusive expressions excluding the presence of other components.

FIG. 1 is a diagram showing a schematic configuration of a gas turbine 2 according to an embodiment.

As shown in FIG. 1, the gas turbine 2 comprises a compressor 4, a combustor 6 for mixing compressed air generated by the compressor 4 with fuel to perform combustion, and a turbine 8 for obtaining power from combustion gas generated by the combustor 6.

As shown in FIG. 1, the turbine 8 includes a rotor 9 (turbine rotor), a turbine casing 10 that accommodates the rotor 9, a plurality of turbine stator blades 12 (gas turbine stator blades) that are fixed to an inner surface of the turbine casing 10, and a plurality of turbine rotor blades 16 that are installed in the rotor 9 to be alternately disposed in an axial direction with respect to the turbine stator blades 12.

Figure 2:
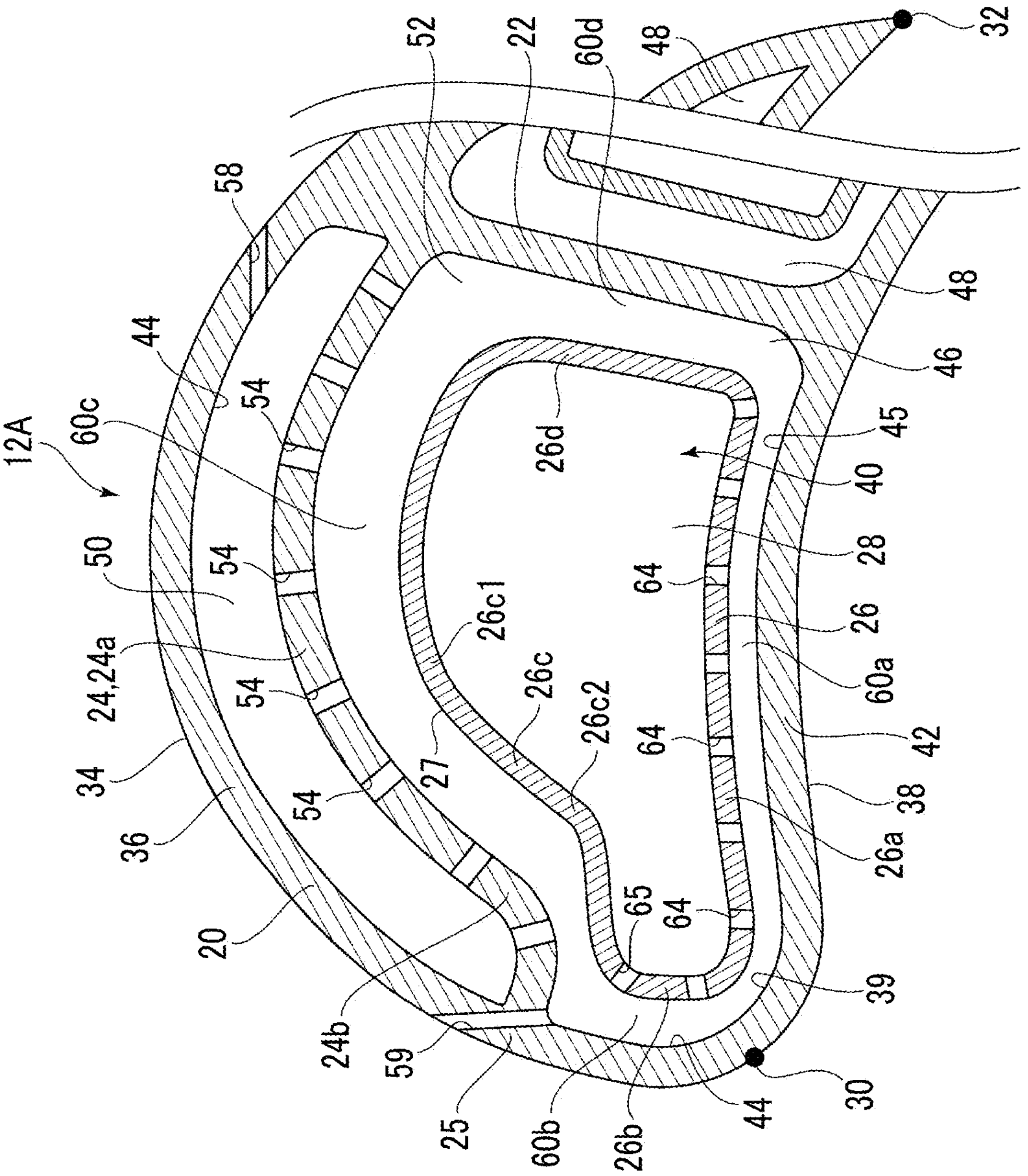
FIG. 2 is a diagram showing an example of a cross section of a central portion of a turbine stator blade 12A of a second stage of a turbine 8 in a blade height direction (cross section orthogonal to the blade height direction).

FIG. 2 is a diagram showing an example of a cross section of a central portion of a turbine stator blade 12A of a second stage of a turbine 8 in a blade height direction (cross section orthogonal to the blade height direction), for example.

As shown in FIG. 2, the turbine stator blade 12A includes a blade body 20, a leading edge portion partition wall 22, a negative pressure surface-side partition wall 24, and a pressure surface-side insert 26.

The blade body 20 includes a leading edge 30, a trailing edge 32, a negative pressure surface forming wall 36 that forms a negative pressure surface 34 connecting the leading edge 30 and the trailing edge 32, and a pressure surface forming wall 42 that forms a pressure surface 38 connecting the leading edge 30 and the trailing edge 32 and forms an in-blade cavity 40 between the pressure surface forming wall 42 and the negative pressure surface forming wall 36. Each of the negative pressure surface forming wall 36 and the pressure surface forming wall 42 may have a curved plate shape with a substantially constant thickness. The in-blade cavity 40 is formed on an inner side of the blade body 20 from one end portion to the other end portion of the blade body 20 along the blade height direction. In the present specification, the term "blade height direction" means the blade height direction of the turbine stator blade 12A, that is, the blade height direction of the blade body 20.

The leading edge portion partition wall 22 is provided in the in-blade cavity 40, and is integrally formed with the blade body 20 by casting. The leading edge portion partition wall 22 is configured to extend from an inner surface 44 of the negative pressure surface forming wall 36 to an inner surface 45 of the pressure surface forming wall 42 to divide the in-blade cavity 40 into a leading edge-side cavity 46 and a trailing edge-side cavity 48. The leading edge portion partition wall 22 may have a plate shape with a substantially constant thickness.

The negative pressure surface-side partition wall 24 is provided in the leading edge-side cavity 46, and is integrally formed with the blade body 20 by casting. The negative pressure surface-side partition wall 24 is configured to extend from the inner surface of the blade body 20 (the inner surface 44 of the negative pressure surface forming wall 36 in the example shown in the drawing) to the leading edge portion partition wall 22 in the leading edge-side cavity 46 to divide the leading edge-side cavity 46 into a negative pressure surface-side cavity 50 and a pressure surface-side cavity 52. A plurality of negative pressure surface-side impingement cooling holes 54 for performing impingement cooling on the negative pressure surface forming wall 36 are formed in the negative pressure surface-side partition wall 24. Only the negative pressure surface-side partition wall 24 is provided as a partition wall formed by casting in the leading edge-side cavity 46, and the partition wall formed by casting is not provided in the leading edge-side cavity 46 other than the negative pressure surface-side partition wall 24. The negative pressure surface-side partition wall 24 may have a curved plate shape with a substantially constant thickness.

In the example shown in the drawing, in the cross section orthogonal to the blade height direction, the negative pressure surface-side partition wall 24 is curved in an S shape, and includes a first curved portion 24*a* that extends along the negative pressure surface forming wall 36 and is curved to be convex toward a negative pressure surface 34 side and a second curved portion 24*b* that is curved to be convex toward a pressure surface 38 side. One end of the first curved portion 24*a* is connected to a position on the negative pressure surface forming wall 36 side in the leading edge portion partition wall 22, and the other end of the first curved portion 24*a* is connected to one end of the second curved portion 24*b*. The other end of the second curved portion 24*b* is connected to a position near the leading edge 30 in the negative pressure surface forming wall 36.

The pressure surface-side insert 26 is formed of a sheet metal in a tube shape to extend from one end portion to the other end portion of the blade body 20 along the blade height direction, and is inserted into the pressure surface-side cavity 52. An internal space 28 of the pressure surface-side insert 26 communicates with an outer side cavity (not shown) formed between the turbine casing 10 (refer to FIG. 1) and the turbine stator blade 12A, and the compressed air supplied from the compressor 4 to the outer side cavity is supplied to the internal space 28 of the pressure surface-side insert 26 from the outer side cavity as cooling air.

In the pressure surface-side insert 26, a gap serving as a passage for the cooling air is formed between an outer peripheral surface 27 of the pressure surface-side insert 26 and a wall surface facing the outer peripheral surface 27 of the pressure surface-side insert 26. In the example shown in the drawing, a gap 60*a* serving as an air passage is provided between the pressure surface-side insert 26 and the pressure surface forming wall 42, a gap 60*b* is provided between a portion of the negative pressure surface forming wall 36 facing the pressure surface-side cavity 52 and the pressure surface-side insert 26, a gap 60*c* is provided between the pressure surface-side insert 26 and the negative pressure surface-side partition wall 24, and a gap 60*d* is provided between the pressure surface-side insert 26 and the leading edge portion partition wall 22.

A plurality of pressure surface-side impingement cooling holes 64 for performing the impingement cooling on the inner surface 45 of the pressure surface forming wall 42 are formed in the pressure surface-side insert 26. The plurality of pressure surface-side impingement cooling holes 64 are formed, as through-holes penetrating a wall surface of the pressure surface-side insert 26, at a portion 26*a* of the pressure surface-side insert 26 facing the pressure surface forming wall 42, and communicate with the internal space 28 of the pressure surface-side insert 26 and the gap 60*a*.

In the example shown in the drawing, a plurality of impingement cooling holes 65 for performing the impingement cooling on the inner surface 44 facing the pressure surface-side cavity 52 in the negative pressure surface forming wall 36 are formed in the pressure surface-side insert 26. The plurality of impingement cooling holes 65 disposed along the blade height direction are formed, as the through-holes penetrating the wall surface of the pressure surface-side insert 26, at a portion 26*b* of the pressure surface-side insert 26 facing the negative pressure surface forming wall 36 (portion of the negative pressure surface forming wall 36 facing the pressure surface-side cavity 52). The impingement cooling holes are not formed in a portion 26*c* of the pressure surface-side insert 26 facing the negative pressure surface-side partition wall 24 and a portion 26*d* of the pressure surface-side insert 26 facing the leading edge portion partition wall 22.

In the example shown in the drawing, in the cross section orthogonal to the blade height direction, the portion 26*c* of the pressure surface-side insert 26 facing the negative pressure surface-side partition wall 24 is formed in an S shape along the negative pressure surface-side partition wall 24, and includes a third curved portion 26*c*1 that extends along the first curved portion 24*a* of the negative pressure surface-side partition wall 24 and is curved to be convex toward the negative pressure surface 34 side and a fourth curved portion 26*c*2 that extends along the second curved portion 24*b* of the negative pressure surface-side partition wall 24 and is curved to be convex toward the pressure surface 38 side.

In the example shown in the drawing, only the pressure surface-side insert 26 is provided, as the tube-shaped insert, in the pressure surface-side cavity 52, and the tube-shaped insert is not provided in the pressure surface-side cavity 52 other than the pressure surface-side insert 26. Further, the tube-shaped insert is not provided in the negative pressure surface-side cavity 50.

A film cooling hole that communicates the pressure surface-side cavity 52 with the outside of the blade body 20 is not formed in the pressure surface forming wall 42, and a plurality of film cooling holes 58 that communicate the negative pressure surface-side cavity 50 with the outside of the blade body 20 are formed in the negative pressure surface forming wall 36. In the example shown in the drawing, the plurality of film cooling holes 58 are disposed along the blade height direction at a position closer to the leading edge portion partition wall 22 in the negative pressure surface forming wall 36. Each of the film cooling holes 58 extends in a direction inclined with respect to a direction orthogonal to the negative pressure surface 34 at a position of an outlet of the film cooling hole 58 such that the film cooling hole 58 directs toward a downstream side in a flow direction of the combustion gas along the negative pressure surface 34 as the film cooling hole 58 approaches the negative pressure surface 34.

Further, in the example shown in the drawing, a plurality of film cooling holes 59 that communicate the pressure surface-side cavity 52 with the outside of the blade body 20 and are disposed along the blade height direction are formed in a connecting portion 25 where the negative pressure surface forming wall 36 and the negative pressure surface-side partition wall 24 are connected to each other. The plurality of film cooling holes 59 are provided to cool the negative pressure surface forming wall 36 at the connecting portion 25 where the cooling effect by the impingement cooling is difficult to be obtained, and are disposed along the blade height direction. Each of the film cooling holes 59 extends in a direction inclined with respect to a direction orthogonal to the negative pressure surface 34 at a position of an outlet of the film cooling hole 59 such that the film cooling hole 59 directs toward the downstream side in the flow direction of the combustion gas along the negative pressure surface 34 as the film cooling hole 59 approaches the negative pressure surface 34.

Figure 3:
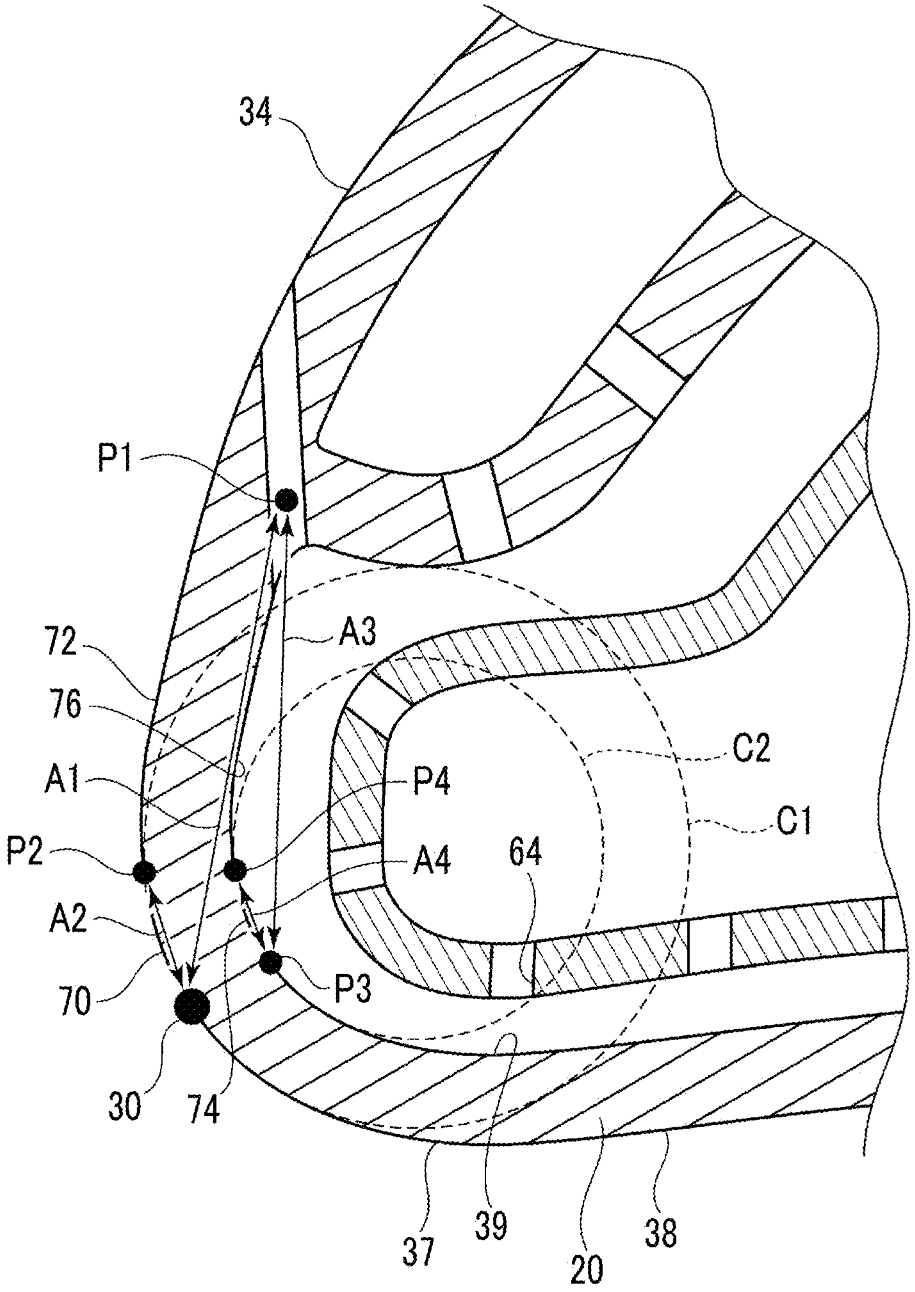
FIG. 3 is an enlarged view of the vicinity of a leading edge 30 in the cross section shown in FIG. 2.

FIG. 3 is an enlarged view of the vicinity of the leading edge 30 in the cross section shown in FIG. 2.

As shown in FIG. 3, in the cross section orthogonal to the blade height direction, a blade surface 37 of the blade body 20 (an outer surface of the blade body 20, that is, a surface formed of the negative pressure surface 34 and the pressure surface 38) includes an arc 70 that passes through the leading edge 30 and has a constant curvature radius and a curved-line portion 72 that is connected to the arc 70 on the negative pressure surface 34 side of the blade body 20 and has a curvature radius larger than the curvature radius of the arc 70. In a case where a position where the negative pressure surface-side partition wall 24 and the inner surface of the negative pressure surface forming wall 36 are connected to each other is defined as P1, a position of a boundary between the arc 70 and the curved-line portion 72 is defined as P2, a distance between the leading edge 30 and the position P1 is defined as A1, and a distance between the leading edge 30 and the position P2 is defined as A2, A1>A2 is satisfied. In the example shown in the drawing, the position P1 is located on an outer side of a circle C1 including the arc 70. In the example shown in the drawing, in the cross section orthogonal to the blade height direction, the position P1 means, in more detail, a central position of a thickness of the negative pressure surface-side partition wall 24 at the position where the inner surface 44 of the negative pressure surface forming wall 36 and the negative pressure surface-side partition wall 24 are connected to each other.

As shown in FIG. 3, in the cross section orthogonal to the blade height direction, in a case where a position on a back side of the leading edge 30 corresponding to the leading edge 30 on an inner surface 39 (a surface formed of the inner surface 44 of the negative pressure surface forming wall 36 and the inner surface 45 of the pressure surface forming wall 42) of the blade body 20 (an intersection between a straight line passing through the leading edge 30 and orthogonal to the blade surface 37 and the inner surface 39) is defined as P3, the inner surface 39 of the blade body 20 includes an arc 74 that passes through the position P3 and has a constant curvature radius and a curved-line portion 76 that is connected to the arc 74 on the negative pressure surface 34 side of the blade body 20 and has a curvature radius larger than the curvature radius of the arc 74. In a case where a position of a boundary between the arc 74 and the curved-line portion 76 is defined as P4, a distance between the position P1 and the position P3 is defined as A3, and a distance between the position P3 and the position P4 is defined as A4, A3>A4 is satisfied. In the example shown in the drawing, the position P1 is located on an outer side of a circle C2 including the arc 74.

Figure 4:
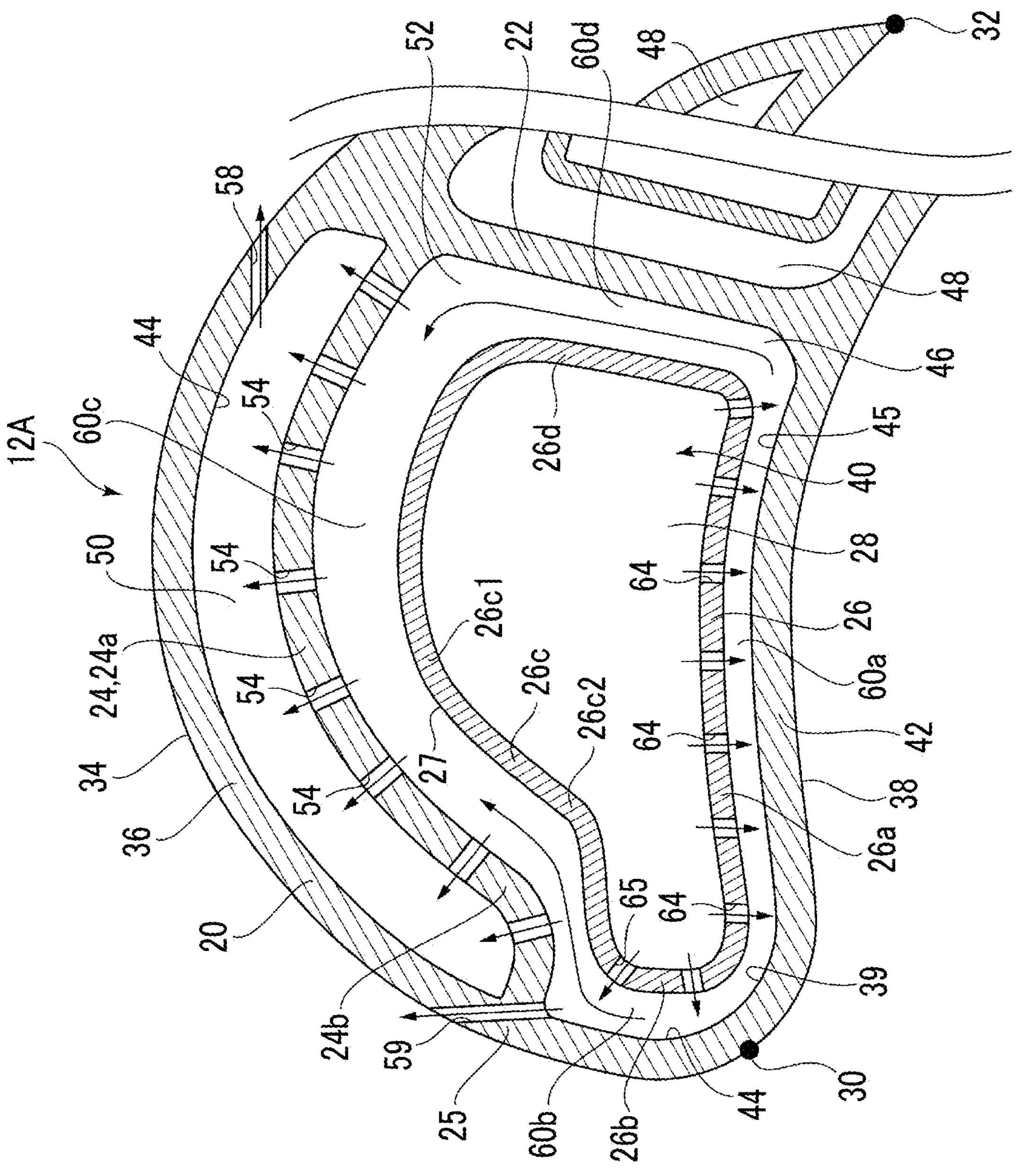
FIG. 4 is a diagram showing a flow of cooling air in the cross section shown in FIG. 2 by arrows.

Hereinafter, a flow of the cooling air in the turbine stator blade 12A will be described with reference to FIG. 4. FIG. 4 is a cross-sectional view of the flow of the cooling air in the cross section shown in FIG. 2 by arrows.

As shown in FIG. 4, the cooling air supplied from an outer side cavity (not shown) to the internal space 28 of the pressure surface-side insert 26 is blown to the inner surface 45 of the pressure surface forming wall 42 by passing through the plurality of impingement cooling holes 64 formed in the pressure surface-side insert 26 to perform the impingement cooling on the inner surface 45 of the pressure surface forming wall 42.

A part of the cooling air that has performed the impingement cooling on the pressure surface forming wall 42 by passing through the plurality of impingement cooling holes 64 passes through the gap 60*a* between the pressure surface-side insert 26 and the pressure surface forming wall 42, the gap 60*b* between the pressure surface-side insert 26 and the negative pressure surface forming wall 36, and the gap 60*c* between the pressure surface-side insert 26 and the negative pressure surface-side partition wall 24 in this order to be supplied to the plurality of impingement cooling holes 54 of the negative pressure surface-side partition wall 24. That is, the gap 60*a*, the gap 60*b*, and the gap 60*c* configure the passage for the cooling air from the impingement cooling hole 64 to the impingement cooling hole 54.

The other part of the cooling air that has performed the impingement cooling on the inner surface 45 of the pressure surface forming wall 42 by passing through the plurality of impingement cooling holes 64 passes through the gap 60*a* between the pressure surface-side insert 26 and the pressure surface forming wall 42, the gap 60*d* between the pressure surface-side insert 26 and the leading edge portion partition wall 22, and the gap 60*c* between the pressure surface-side insert 26 and the negative pressure surface-side partition wall 24 in this order to be supplied to the plurality of impingement cooling holes 54 of the negative pressure surface-side partition wall 24. That is, the gap 60*a*, the gap 60*d*, and the gap 60*c* configure the passage for the cooling air from the impingement cooling hole 64 to the impingement cooling hole 54.

The cooling air supplied from the gap 60*c* to the plurality of impingement cooling holes 54 is blown to the inner surface 44 of the negative pressure surface forming wall 36 by passing through the plurality of impingement cooling holes 54 and the negative pressure surface-side cavity 50 in this order to perform the impingement cooling on the inner surface 44 of the negative pressure surface forming wall 36. The cooling air that has performed the impingement cooling on the negative pressure surface forming wall 36 by passing through the plurality of impingement cooling holes 54 is discharged to the outside of the blade body 20 by passing through the plurality of film cooling holes 58 formed in the negative pressure surface forming wall 36, and film cooling is performed on the negative pressure surface 34 on the downstream side of the film cooling holes 58 in the flow direction of the combustion gas.

Hereinafter, effects exhibited by the turbine stator blade 12A will be described.

In the turbine stator blade 12A, at least a part of the cooling air passing through the pressure surface-side impingement cooling hole 64 of the pressure surface-side insert 26 performs the impingement cooling on the inner surface 44 of the negative pressure surface forming wall 36 by passing through the gap 60*a*, the gap 60*b*, the gap 60*c*, and the negative pressure surface-side impingement cooling hole 54 in this order. At least a part of the cooling air passing through the pressure surface-side impingement cooling hole 64 of the pressure surface-side insert 26 performs the impingement cooling on the inner surface 44 of the negative pressure surface forming wall 36 by passing through the gap 60*a*, the gap 60*d*, the gap 60*c*, and the negative pressure surface-side impingement cooling hole 54 in this order. As described above, the cooling air passing through the pressure surface-side impingement cooling hole 64 of the pressure surface-side insert 26 performs the impingement cooling on the inner surface 45 of the pressure surface forming wall 42, and then further performs the impingement cooling on the inner surface 44 of the negative pressure surface forming wall 36 by passing through the negative pressure surface-side impingement cooling hole 54 of the negative pressure surface-side partition wall 24.

As described above, with the reuse of the cooling air used for the impingement cooling of the inner surface 45 of the pressure surface forming wall 42 for the impingement cooling of the inner surface 44 of the negative pressure surface-side partition wall, it is possible to reduce a use amount of the cooling air (cooling air amount) to cool the turbine stator blade 12A. Further, since the negative pressure surface-side partition wall 24 and the blade body 20 are integrally formed by casting, a problem of the cooling air leakage from the gap between the rib-shaped wall and the insert on the negative pressure surface side in the configuration disclosed in PTL 1 does not occur. Therefore, it is possible to effectively perform the impingement cooling on the inner surface 44 of the negative pressure surface forming wall 36 with a small cooling air amount. Accordingly, it is possible to effectively reduce the use amount of the cooling air (cooling air amount) to cool the turbine stator blade 12A.

Further, in the turbine stator blade 12A, the pressure surface forming wall 42 is not formed with the film cooling hole that communicates the pressure surface-side cavity 52 with the outside of the blade body 20, and the negative pressure surface 34 is formed with the film cooling hole 58 that communicates the negative pressure surface-side cavity 50 with the outside of the blade body 20. Accordingly, it is possible to efficiently reuse the cooling air after being used for the impingement cooling of the inner surface 45 of the pressure surface forming wall 42 for the impingement cooling of the inner surface 44 of the negative pressure surface forming wall 36. Further, even in a case where a pressure of the cooling air is reduced by performing the two-stage impingement cooling including the impingement cooling of the inner surface 45 of the pressure surface forming wall 42 and the impingement cooling of the inner surface 44 of the negative pressure surface forming wall 36, a pressure of the combustion gas around the blade body 20 is lower on the negative pressure surface side than on the pressure surface side. Therefore, it is possible to discharge the cooling air to the outside of the blade body 20 from the film cooling hole 58 formed in the negative pressure surface forming wall 36 to perform the film cooling on the negative pressure surface 34 without excessively increasing the pressure of the cooling air supplied to the pressure surface-side insert 26. Accordingly, it is possible to effectively cool the pressure surface forming wall 42 and the negative pressure surface forming wall 36 with a small cooling air amount.

Further, in general, the pressure of the combustion gas is likely to be high in the leading edge 30 of the blade body 20 and the vicinity thereof. However, in the turbine stator blade 12A, since the negative pressure surface-side partition wall 24 extends from the inner surface 44 of the negative pressure surface forming wall 36 to the leading edge portion partition wall 22, it is possible to set a pressure of a space on the back side of the leading edge 30 in the blade body 20 (pressure in the vicinity of the position P3) to a relatively high pressure of the cooling air before a second stage impingement cooling. Therefore, it is possible to increase the pressure on the back side of the leading edge 30 of the blade body 20 as compared with a case where the negative pressure surface-side partition wall 24 extends from the inner surface 45 of the pressure surface forming wall 42 to the leading edge portion partition wall 22 (for example, refer to FIG. 5). Therefore, even in a case where a hole is opened at the position of the leading edge 30 of the blade body 20 due to a thermal damage or the like, it is possible to suppress inflow of high-temperature combustion gas into the blade body 20 by the high pressure of the cooling air before the second stage impingement cooling, and thus it is possible to suppress the damage inside the turbine stator blade 12A.

Further, in the configuration described using FIG. 3, the pressure of the combustion gas is likely to be particularly high in a portion of the arc 70 passing through the leading edge 30 of the blade body 20. Therefore, with satisfaction of A1>A2 as described above (and/or satisfaction of A3>A4), even in a case where a hole is opened at the position of the arc 70 of the blade body 20 due to the thermal damage, it is possible to suppress the inflow of the high-temperature combustion gas into the blade body 20 by the high pressure of the cooling air before the second stage impingement cooling, and thus it is possible to suppress the damage inside the turbine stator blade 12A.

The present disclosure is not limited to the embodiments described above, and includes a form in which a modification is added to the embodiments described above or a form in which the above forms are combined as appropriate.

Figure 5:
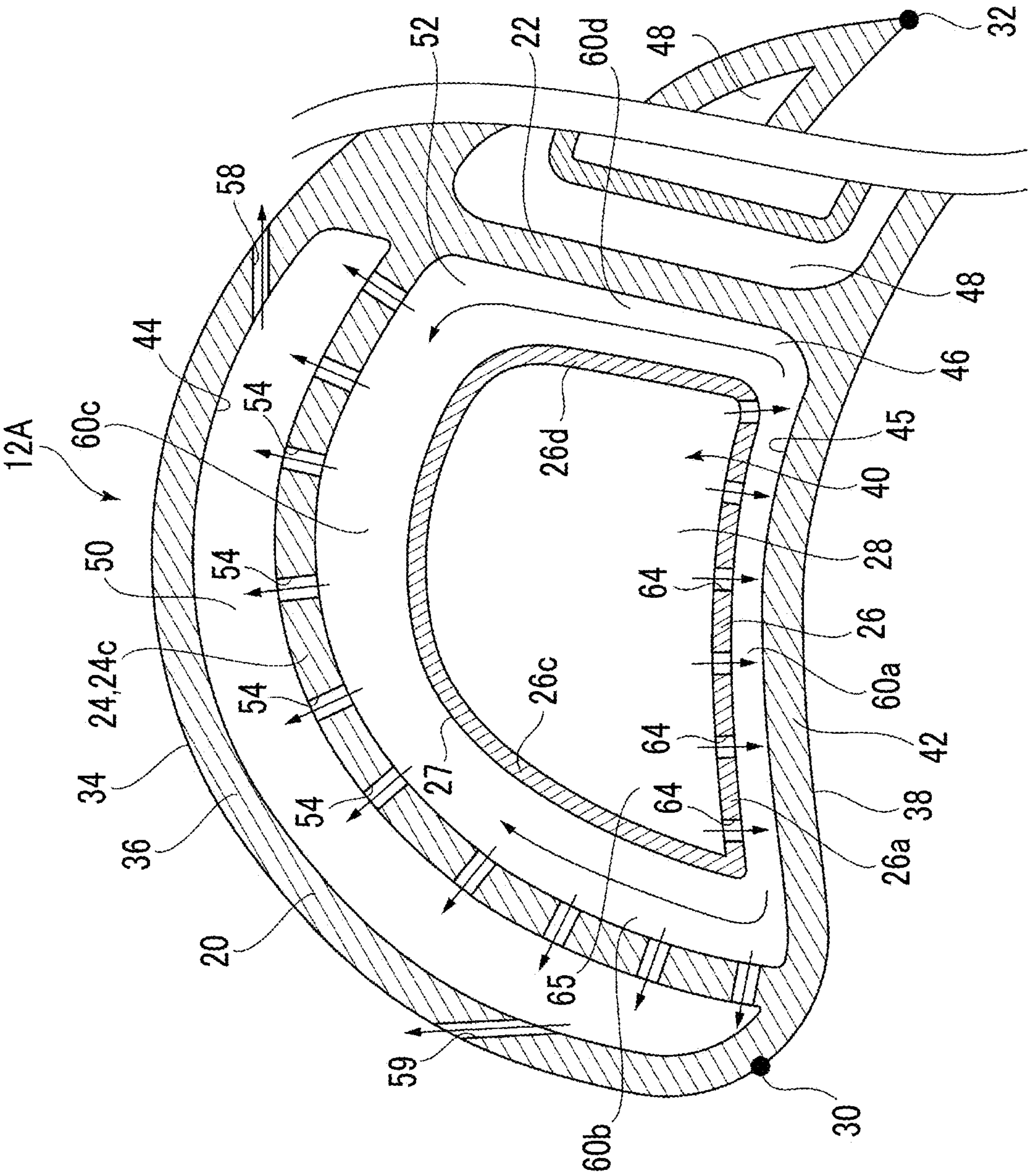
FIG. 5 is a diagram showing another example of the cross section of the central portion of the turbine stator blade 12A of the second stage of the turbine 8 in the blade height direction (cross section orthogonal to the blade height direction).

In some embodiments, for example, as shown in FIG. 5, one end of the negative pressure surface-side partition wall 24 may be connected to the inner surface 45 of the pressure surface forming wall 42. In this case, in the cross section orthogonal to the blade height direction, the negative pressure surface-side partition wall 24 may be configured by only a curved-line portion 24*c* that is convex toward the negative pressure surface side.

The contents described in each embodiment are understood as follows, for example.

(1) A gas turbine stator blade (for example, the turbine stator blade 12A) according to at least one embodiment of the present disclosure comprises a blade body (for example, the blade body 20) including a negative pressure surface forming wall (for example, the negative pressure surface forming wall 36) that forms a negative pressure surface (for example, the negative pressure surface 34) and a pressure surface forming wall (for example, the pressure surface forming wall 42) that forms a pressure surface (for example, the pressure surface 38) and forms an in-blade cavity (for example, the in-blade cavity 40) between the negative pressure surface forming wall and the pressure surface forming wall, a leading edge portion partition wall (for example, the leading edge portion partition wall 22) that is formed integrally with the blade body and extends from an inner surface (for example, the inner surface 44) of the negative pressure surface forming wall to an inner surface (for example, the inner surface 45) of the pressure surface forming wall to divide the in-blade cavity into a leading edge-side cavity (for example, the leading edge-side cavity 46) and a trailing edge-side cavity (for example, the trailing edge-side cavity 48), a negative pressure surface-side partition wall (for example, the negative pressure surface-side partition wall 24) that is formed integrally with the blade body, extends from an inner surface of the blade body to the leading edge portion partition wall in the leading edge-side cavity to divide the leading edge-side cavity into a negative pressure surface-side cavity (for example, the negative pressure surface-side cavity 50) and a pressure surface-side cavity (for example, the pressure surface-side cavity 52), and is formed with a negative pressure surface-side impingement cooling hole (for example, the negative pressure surface-side impingement cooling hole 54) for cooling the negative pressure surface forming wall, and a tube-shaped pressure surface-side insert (for example, the pressure surface-side insert 26) that is inserted into the pressure surface-side cavity to provide a first gap (for example, the gap 60*a*) between the pressure surface forming wall and the pressure surface-side insert and a second gap (for example, the gap 60*c*) between the negative pressure surface-side partition wall and the pressure surface-side insert and is formed with a pressure surface-side impingement cooling hole (for example, the pressure surface-side impingement cooling hole 64) for cooling the pressure surface forming wall, in which at least a part of cooling air passing through the pressure surface-side impingement cooling hole of the pressure surface-side insert is configured to cool the negative pressure surface forming wall by passing through the first gap, the second gap, and the negative pressure surface-side impingement cooling hole.

With the gas turbine stator blade described in (1) above, the cooling air used for the impingement cooling of the inner surface of the pressure surface forming wall can be reused for the impingement cooling of the inner surface of the negative pressure surface-side partition wall, and thus it is possible to reduce the use amount of the cooling air (cooling air amount) to cool the gas turbine stator blade. Further, since the negative pressure surface-side partition wall and the blade body are integrally formed, the problem of the cooling air leakage from the gap between the rib-shaped wall and the insert on the negative pressure surface side in the configuration disclosed in PTL 1 does not occur. Therefore, it is possible to effectively perform the impingement cooling on the inner surface of the negative pressure surface forming wall with a small cooling air amount. Accordingly, it is possible to effectively reduce the use amount of the cooling air (cooling air amount) to cool the gas turbine stator blade.

(2) In some embodiments, in the gas turbine stator blade according to (1), the pressure surface forming wall is not formed with a film cooling hole that communicates the pressure surface-side cavity with an outside of the blade body, and the negative pressure surface forming wall is formed with a film cooling hole (for example, the film cooling hole 58) that communicates the negative pressure surface-side cavity with the outside of the blade body.

With the gas turbine stator blade according to (2) above, it is possible to efficiently reuse the cooling air after being used for the impingement cooling of the inner surface of the pressure surface forming wall for the impingement cooling of the inner surface of the negative pressure surface forming wall. Further, since the pressure of the cooling air is reduced by performing the two-stage impingement cooling including the impingement cooling of the inner surface of the pressure surface forming wall and the impingement cooling of the inner surface of the negative pressure surface forming wall, the pressure of the combustion gas around the blade body is lower on the negative pressure surface side than on the pressure surface side. Therefore, it is possible to discharge the cooling air to the outside of the blade body from the film cooling hole formed in the negative pressure surface forming wall to perform the film cooling on the negative pressure surface without excessively increasing the pressure of the cooling air supplied to the pressure surface-side insert. Accordingly, it is possible to effectively cool the pressure surface forming wall and the negative pressure surface forming wall with a small cooling air amount.

(3) In some embodiments, in the gas turbine stator blade according to (1) or (2), the blade body and the negative pressure surface-side partition wall are integrally formed by casting, and the pressure surface-side insert is formed of a sheet metal.

Therefore, with the gas turbine stator blade described in (3) above, since the blade body and the negative pressure surface-side partition wall are integrally formed, the problem of the cooling air leakage from the gap between the rib-shaped wall and the insert on the negative pressure surface side in the configuration disclosed in PTL 1 does not occur. Therefore, it is possible to effectively perform the impingement cooling on the inner surface of the negative pressure surface forming wall with a small cooling air amount. Further, the pressure surface-side insert is formed of the sheet metal, and thus it is possible to easily manufacture the gas turbine stator blade according to (1) or (2) above.

(4) In some embodiments, in the gas turbine stator blade according to any one of (1) to (3), the negative pressure surface-side partition wall extends from the inner surface of the negative pressure surface forming wall to the leading edge portion partition wall.

The pressure of the combustion gas is likely to be high in the leading edge of the blade body and the vicinity thereof. However, in the gas turbine stator blade (for example, refer to FIG. 4) described in (4) above, since the pressure of the space on the back side of the leading edge in the blade body can be set to the pressure of the cooling air before the second stage impingement cooling, it is possible to increase the pressure on the back side of the leading edge of the blade body as compared with a case where the negative pressure surface-side partition wall extends from the inner surface of the pressure surface forming wall to the leading edge portion partition wall (for example, refer to FIG. 5). Therefore, even in a case where a hole is opened at the position of the leading edge of the blade body due to the thermal damage, it is possible to suppress the inflow of the high-temperature combustion gas into the blade body by the high pressure of the cooling air before the second stage impingement cooling, and thus it is possible to suppress the damage inside the gas turbine stator blade.

(5) In some embodiments, in the gas turbine stator blade according to (4),

- in a cross section orthogonal to a blade height direction, a blade surface (for example, the blade surface 37) of the blade body includes an arc (for example, the arc 70) that passes through a leading edge (for example, the leading edge 30) of the blade body and has a constant curvature radius, and a curved-line portion (for example, the curved-line portion 72) that is connected to the arc on a negative pressure surface side of the blade body and has a curvature radius larger than the curvature radius of the arc, and
- in the cross section orthogonal to the blade height direction, in a case where a position at which the negative pressure surface-side partition wall and the inner surface of the negative pressure surface forming wall are connected is defined as P1, a position of a boundary between the arc and the curved-line portion is defined as P2, a distance between the leading edge and the position P1 is defined as A1, and a distance between the leading edge and the position P2 is defined as A2, A1>A2 is satisfied.

The pressure of the combustion gas is likely to be particularly high in the portion of the arc passing through the leading edge of the blade body. Therefore, with satisfaction of A1>A2 as described in (5) above, even in a case where a hole is opened at the position of the arc of the blade body due to the thermal damage, it is possible to suppress the inflow of the high-temperature combustion gas into the blade body by the high pressure of the cooling air before the second stage impingement cooling, and thus it is possible to suppress the damage inside the gas turbine stator blade.

(6) In some embodiments, in the gas turbine stator blade according to (4) or (5),

- in a cross section orthogonal to a blade height direction, in a case where a position on a back side of a leading edge (for example, the leading edge) of the blade body corresponding to the leading edge of the blade body on the inner surface of the blade body is defined as P3, the inner surface of the blade body includes an arc (for example, the arc 74) that passes through the position P3 and has a constant curvature radius, and a curved-line portion (for example, the curved-line portion 76) that is connected to the arc on a negative pressure surface forming wall side of the blade body and has a curvature radius larger than the curvature radius of the arc, and
- in the cross section orthogonal to the blade height direction, in a case where a position of a boundary between the arc and the curved-line portion is defined as P4, a distance between the position P1 and the position P3 is defined as A3, and a distance between the position P3 and the position P4 is defined as A4, A3>A4 is satisfied.

The pressure of the combustion gas is likely to be particularly high in the portion of the arc passing through the leading edge of the blade body. Therefore, with satisfaction of A3>A4 as described in (6) above, even in a case where a hole is opened at the position of the arc of the blade body due to the thermal damage, it is possible to suppress the inflow of the high-temperature combustion gas into the blade body by the high pressure of the cooling air before the second stage impingement cooling, and thus it is possible to suppress the damage inside the gas turbine stator blade.

(7) In some embodiments, in the gas turbine stator blade according to any one of (4) to (6), in a cross section orthogonal to the blade height direction, the negative pressure surface-side partition wall is curved in an S shape, and includes a first curved portion (for example, the first curved portion 24*a*) that extends along the negative pressure surface forming wall and is curved to be convex toward a negative pressure surface side, and a second curved portion (for example, the second curved portion 24*b*) that is curved to be convex toward a pressure surface side, in which the first curved portion is connected to a position on a negative pressure surface forming wall side of the leading edge portion partition wall and the second curved portion is connected to the inner surface of the negative pressure surface forming wall.

With the gas turbine stator blade described in (7) above, it is possible to obtain the effects exhibited by the gas turbine stator blade described in any one of (4) to (6) above, and since the distance between the negative pressure surface forming wall and the negative pressure surface-side partition wall can be set to be constant over a wide range, it is possible to effectively perform the impingement cooling on the inner surface of the negative pressure surface forming wall.

(8) In some embodiments, in the gas turbine stator blade according to (7), in the cross section orthogonal to the blade height direction, a portion (for example, the portion 26*c*) of the pressure surface-side insert facing the negative pressure surface-side partition wall is formed in an S shape along the negative pressure surface-side partition wall, and includes a third curved portion (for example, the third curved portion 26*c*1) that extends along the first curved portion of the negative pressure surface-side partition wall and is curved to be convex toward the negative pressure surface side, and a fourth curved portion (for example, the fourth curved portion 26*c*2) that extends along the second curved portion of the negative pressure surface-side partition wall and is curved to be convex toward the pressure surface side.

With the gas turbine stator blade described in (8) above, the portion of the pressure surface-side insert facing the negative pressure surface-side partition wall is formed in the S shape along the negative pressure surface-side partition wall, and thus it is possible to obtain the effects of the gas turbine stator blade described in (7) above while suppressing an increase in pressure loss in the pressure surface-side cavity.

(9) In some embodiments, in the gas turbine stator blade according to any one of (1) to (8), a third gap (for example, the gap 60*d*) is provided between the pressure surface-side insert and the leading edge portion partition wall, and at least a part of the cooling air passing through the pressure surface-side impingement cooling hole of the pressure surface-side insert is configured to cool the negative pressure surface forming wall by passing through the first gap, the third gap, the second gap, and the negative pressure surface-side impingement cooling hole.

With the gas turbine stator blade according to (9) described above, it is possible to obtain the effects of the gas turbine stator blade according to any one of (1) to (8) above while suppressing an increase in pressure loss in the pressure surface-side cavity.

(10) In some embodiments, in the gas turbine stator blade according to any one of (1) to (9), a film cooling hole that communicates the pressure surface-side cavity with an outside of the blade body is formed in a connecting portion (for example, the connecting portion 25) where the negative pressure surface forming wall and the negative pressure surface-side partition wall are connected.

With the gas turbine stator blade according to (10) above, it is possible to effectively cool, using the air passing through the film cooling hole, the connecting portion that is difficult to obtain a cooling effect by the impingement cooling.

(11) The gas turbine according to at least one embodiment of the present disclosure comprises the gas turbine stator blade according to any one of (1) to (10), a turbine rotor, and a casing that accommodates the turbine rotor.

With the gas turbine described in (11) above, it is possible to reduce the use amount of the cooling air to cool the gas turbine stator blade.

REFERENCE SIGNS LIST

2: gas turbine
4: compressor
6: combustor
8: turbine
9: rotor
10: turbine casing
12, 12A: turbine stator blade (gas turbine stator blade)
16: turbine rotor blade
20: blade body
22: leading edge portion partition wall
24: negative pressure surface-side partition wall
24*a*: first curved portion
24*b*: second curved portion
24*c*: curved-line portion
26: pressure surface-side insert
26*a*, 26*b*, 26*c*, 26*d*: portion
26*c*1: third curved portion
26*c*2: fourth curved portion
27: outer peripheral surface
28: internal space
30: leading edge
32: trailing edge
34: negative pressure surface
36: negative pressure surface forming wall
37: blade surface
38: pressure surface
39, 44, 45: inner surface
40: in-blade cavity
42: pressure surface forming wall
46: leading edge-side cavity
48: trailing edge-side cavity
50: negative pressure surface-side cavity
52: pressure surface-side cavity
54: negative pressure surface-side impingement cooling hole
58, 59: film cooling hole
64: pressure surface-side impingement cooling hole

65: impingement cooling hole
60*a*, 60*b*, 60*c*, 60*d*: gap
70, 74: arc
72, 76: curved-line portion

The invention claimed is:

1. A gas turbine stator blade comprising:

a blade body including a negative pressure surface forming wall that forms a negative pressure surface and a pressure surface forming wall that forms a pressure surface and forms an in-blade cavity between the negative pressure surface forming wall and the pressure surface forming wall;

a leading edge portion partition wall that is formed integrally with the blade body and extends from an inner surface of the negative pressure surface forming wall to an inner surface of the pressure surface forming wall to divide the in-blade cavity into a leading edge-side cavity and a trailing edge-side cavity;

a negative pressure surface-side partition wall that is formed integrally with the blade body, extends from an inner surface of the blade body to the leading edge portion partition wall in the leading edge-side cavity to divide the leading edge-side cavity into a negative pressure surface-side cavity and a pressure surface-side cavity, and is formed with a negative pressure surface-side impingement cooling hole for cooling the negative pressure surface forming wall; and a tube-shaped pressure surface-side insert that is inserted into the pressure surface-side cavity to provide a first gap between the pressure surface forming wall and the tube-shaped pressure surface-side insert and a second gap between the negative pressure surface-side partition wall and the tube-shaped pressure surface-side insert and is formed with a pressure surface-side impingement cooling hole for cooling the pressure surface forming wall, wherein at least a part of cooling air passing through the pressure surface-side impingement cooling hole of the pressure surface-side insert is configured to cool the negative pressure surface forming wall by passing through the first gap, the second gap, and the negative pressure surface-side impingement cooling hole.

2. The gas turbine stator blade according to claim 1, wherein the pressure surface forming wall is not formed with a film cooling hole that communicates the pressure surface-side cavity with an outside of the blade body, and the negative pressure surface forming wall is formed with a film cooling hole that communicates the negative pressure surface-side cavity with the outside of the blade body.

3. The gas turbine stator blade according to claim 1, wherein the blade body and the negative pressure surface-side partition wall are integrally formed by casting, and the pressure surface-side insert is formed of a sheet metal.

4. The gas turbine stator blade according to claim 1, wherein the negative pressure surface-side partition wall extends from the inner surface of the negative pressure surface forming wall to the leading edge portion partition wall.

5. The gas turbine stator blade according to claim 4, wherein, in a cross section orthogonal to a blade height direction, a blade surface of the blade body includes an arc that passes through a leading edge of the blade body and has a constant curvature radius, and a curved-line portion that is connected to the arc on a negative pressure surface side of the blade body and has a curvature radius larger than the curvature radius of the arc, and in the cross section orthogonal to the blade height direction, in a case where a position at which the negative pressure surface-side partition wall and the inner surface of the negative pressure surface forming wall are connected is defined as P1, a position of a boundary between the arc and the curved-line portion is defined as P2, a distance between the leading edge and the position P1 is defined as A1, and a distance between the leading edge and the position P2 is defined as A2, A1>A2 is satisfied.

6. The gas turbine stator blade according to claim 4, wherein, in a cross section orthogonal to a blade height direction, in a case where a position on a back side of a leading edge of the blade body corresponding to the leading edge of the blade body on the inner surface of the blade body is defined as P3, the inner surface of the blade body includes an arc that passes through the position P3 and has a constant curvature radius, and a curved-line portion that is connected to the arc on a negative pressure surface forming wall side of the blade body and has a curvature radius larger than the curvature radius of the arc, and in the cross section orthogonal to the blade height direction, in a case where a position at which the negative pressure surface-side partition wall and the inner surface of the negative pressure surface forming wall are connected is defined as P1, a position of a boundary between the arc and the curved-line portion is defined as P4, a distance between the position P1 and the position P3 is defined as A3, and a distance between the position P3 and the position P4 is defined as A4, A3>A4 is satisfied.

7. The gas turbine stator blade according to claim 4, wherein, in a cross section orthogonal to a blade height direction, the negative pressure surface-side partition wall is curved in an S shape, and includes a first curved portion that extends along the negative pressure surface forming wall and is curved to be convex toward a negative pressure surface side, and a second curved portion that is curved to be convex toward a pressure surface side, in which the first curved portion is connected to a position on a negative pressure surface forming wall side of the leading edge portion partition wall and the second curved portion is connected to the inner surface of the negative pressure surface forming wall.

8. The gas turbine stator blade according to claim 7, wherein, in the cross section orthogonal to the blade height direction, a portion of the pressure surface-side insert facing the negative pressure surface-side partition wall is formed in an S shape along the negative pressure surface-side partition wall, and includes a third curved portion that extends along the first curved portion of the negative pressure surface-side partition wall and is curved to be convex toward the negative pressure surface side, and a fourth curved portion that extends along the second curved portion of the negative pressure surface-side partition wall and is curved to be convex toward the pressure surface side.

9. The gas turbine stator blade according to claim 1, wherein a third gap is provided between the pressure surface-side insert and the leading edge portion partition wall, and at least a part of the cooling air passing through the pressure surface-side impingement cooling hole of the pressure surface-side insert is configured to cool the inner surface of the negative pressure surface forming wall by passing through the first gap, the third gap, the second gap, and the negative pressure surface-side impingement cooling hole.

10. The gas turbine stator blade according to claim 1, wherein a film cooling hole that communicates the pressure surface-side cavity with an outside of the blade body is formed in a connecting portion where the negative pressure surface forming wall and the negative pressure surface-side partition wall are connected.

11. A gas turbine comprising:

the gas turbine stator blade according to claim 1;

a turbine rotor; and a casing that accommodates the turbine rotor.

* * * * *